(12) United States Patent
Chu

(10) Patent No.: US 9,710,193 B2
(45) Date of Patent: Jul. 18, 2017

(54) METHOD OF DETECTING MEMORY MODULES, MEMORY CONTROL CIRCUIT UNIT AND STORAGE APPARATUS

(71) Applicant: PHISON ELECTRONICS CORP., Miaoli (TW)

(72) Inventor: Chien-Hua Chu, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 239 days.

(21) Appl. No.: 14/140,480

(22) Filed: Dec. 25, 2013

(65) Prior Publication Data
US 2015/0120990 A1   Apr. 30, 2015

(30) Foreign Application Priority Data

Oct. 25, 2013  (TW) .............................. 102138753 A

(51) Int. Cl.
*G06F 3/06*   (2006.01)
*G06F 11/30*  (2006.01)

(52) U.S. Cl.
CPC .......... *G06F 3/0659* (2013.01); *G06F 3/0614* (2013.01); *G06F 3/0632* (2013.01); *G06F 3/0679* (2013.01); *G06F 11/3037* (2013.01); *G06F 11/3055* (2013.01); *G06F 11/3089* (2013.01)

(58) Field of Classification Search
CPC .... G06F 3/0659; G06F 3/0614; G06F 3/0632; G06F 3/0379; G06F 11/3037; G06F 11/3055; G06F 11/3089; G11C 29/56; G11C 16/10; G11C 16/26

See application file for complete search history.

(56) References Cited

U.S. PATENT DOCUMENTS

| | | | | |
|---|---|---|---|---|
| 5,592,641 A | * | 1/1997 | Fandrich | G11C 7/24 365/185.04 |
| 2008/0126675 A1 | * | 5/2008 | Fu | G06F 12/1425 711/103 |
| 2010/0122000 A1 | * | 5/2010 | Jeanne | G06F 13/364 710/110 |
| 2010/0131707 A1 | * | 5/2010 | Chi | G06F 13/385 711/115 |

FOREIGN PATENT DOCUMENTS

| | | |
|---|---|---|
| CN | 101295285 | 10/2008 |
| CN | 101477838 | 7/2009 |
| CN | 101740105 | 6/2010 |

* cited by examiner

*Primary Examiner* — Reginald Bragdon
*Assistant Examiner* — Jane Wei
(74) *Attorney, Agent, or Firm* — Jianq Chyun IP Office

(57) ABSTRACT

A method of detecting a rewritable non-volatile memory module is provided. The method includes setting an output voltage of a write protect pin of a memory interface as a first logic level, giving a read status command and receiving a first status message. The method further includes determining whether a corresponding bit data in the first status message conforms to a status corresponding to the first logic level; and if yes, identifying that the rewritable non-volatile memory module has connected to the memory interface.

15 Claims, 5 Drawing Sheets

METHOD OF DETECTING MEMORY MODULES, MEMORY CONTROL CIRCUIT UNIT AND STORAGE APPARATUS

CROSS-REFERENCE TO RELATED APPLICATION

This application claims the priority benefit of Taiwan application serial no. 102138753, filed on Oct. 25, 2013. The entirety of the above-mentioned patent application is hereby incorporated by reference herein and made a part of this specification.

BACKGROUND

Technology Field

The present invention relates to a method of detecting a rewritable non-volatile memory module, as well as a memory control circuit unit and a memory storage apparatus using the method.

Description of Related Art

Due to characteristics such as data non-volatility, low power consumption, small volume, non-mechanical structure and fast read and write speeds that a rewritable non-volatile memory has, the rewritable non-volatile memory industry has become a major part of the electronic industry in recent years. For instance, solid state drive that uses a flash memory as a storage medium has been widely applied as a hard drive of a computer main unit, so as to increase access efficiency of the computer. When a user selects a sleep mode, a host system interrupts power supply to a memory storage apparatus and a buffer memory in the same way as it is shut down. In addition, when the user desires to return to a normal operation from the sleep mode, the memory storage apparatus requires re-initialization. For instance, generally, a memory control circuit unit in the memory storage apparatus detects whether each rewritable non-volatile memory operated in the memory storage apparatus has successfully connected to a memory interface of the memory control circuit unit by enabling each rewritable non-volatile memory in the memory storage apparatus one by one and according to signals returned to a ready/busy pin of the memory interface. However, in a case where the rewritable non-volatile memory fails to connect to the memory interface of the memory control circuit unit, only when the ready/busy pin does not respond to a ready status (e.g. '0') within a predetermined period of time (i.e. a timeout occurs), the memory control circuit unit is able to determine that the rewritable non-volatile memory does not connect to the memory interface of the memory control circuit unit and thus outputs an error message.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a method of detecting a rewritable non-volatile memory module, a memory control circuit unit and a memory storage apparatus which are capable of promptly determining whether a rewritable non-volatile memory in the memory storage apparatus has connected to the memory control circuit unit.

Accordingly, an exemplary embodiment of the present invention proposes a method of detecting a rewritable non-volatile memory module. The method is applied to detection of a rewritable non-volatile memory module using a memory control circuit unit through a memory interface. The method of detecting a rewritable non-volatile memory module includes: (a) setting an output voltage of a write protect pin of a control bus of the memory interface as a first logic level, giving a read status command through the control bus, and receiving a first status message through a data bus of the memory interface, wherein the control bus and the data bus are buses independent from each other. The present method of detecting a rewritable non-volatile memory module further includes: (b) determining whether a corresponding bit data in the first status message conforms to a status corresponding to the first logic level; and (c) if the corresponding bit data in the first status message conforms to the status corresponding to the first logic level, identifying that the rewritable non-volatile memory module has connected to the memory interface.

An exemplary embodiment of the invention proposes a memory control circuit unit including a memory interface and a memory management circuit. The memory interface includes a control bus and a data bus, wherein the control bus includes a write protect pin, and the control bus and the data bus are buses independent from each other. The memory management circuit is coupled to the memory interface, and is configured to set an output voltage of the write protect pin as a first logic level, give a read status command through the control bus, and receive a first status message through the data bus. In addition, the memory management circuit is further configured to determine whether a corresponding bit data in the first status message conforms to a status corresponding to the first logic level. If the corresponding bit data in the first status message conforms to the status corresponding to the first logic level, the memory management circuit identifies that a rewritable non-volatile memory module has connected to the memory interface.

An exemplary embodiment of the invention proposes a memory storage apparatus including a connection interface unit, a rewritable non-volatile memory module and a memory control circuit unit. The connection interface unit is configured to be coupled to a host system. The rewritable non-volatile memory module includes a plurality of physical erasing units. The memory control circuit unit is coupled to the connection interface unit and the rewritable non-volatile memory module, and includes a memory interface. The memory control circuit unit is configured to set an output voltage of a write protect pin as a first logic level, give a read status command through a control bus, and receive a first status message through a data bus, wherein the control bus and the data bus are buses independent from each other. In addition, the memory control circuit unit is further configured to determine whether a corresponding bit data in the first status message conforms to a status corresponding to the first logic level. If the corresponding bit data in the first status message conforms to the status corresponding to the first logic level, the memory control circuit unit identifies that the rewritable non-volatile memory module has connected to the memory interface.

An exemplary embodiment of the invention proposes a memory storage apparatus including a connection interface unit, a rewritable non-volatile memory module and a memory control circuit unit. The connection interface unit is configured to be coupled to a host system. The rewritable non-volatile memory module includes a plurality of physical erasing units. The memory control circuit unit is coupled to the connection interface unit and the rewritable non-volatile memory module, and includes a memory interface having a control bus and a data bus. The control bus includes a write protect pin, a command latch enable pin, an address latch enable pin and a chip enable pin. The write protect pin, the command latch enable pin, the address latch enable pin and the chip enable pin are respectively coupled to the rewritable non-volatile memory module, wherein the control bus of the memory interface is provided with no ready/busy pin.

Based on the above, the method of detecting a rewritable non-volatile memory module, the memory control circuit unit and the memory storage apparatus in the aforementioned exemplary embodiments are capable of reducing time required for detecting whether the rewritable non-volatile memory module is normally connected.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

To make the above features and advantages of the invention more comprehensible, embodiments accompanied with drawings are described in detail as follows.

DETAILED DESCRIPTION OF DISCLOSED EMBODIMENTS

Figure 1:
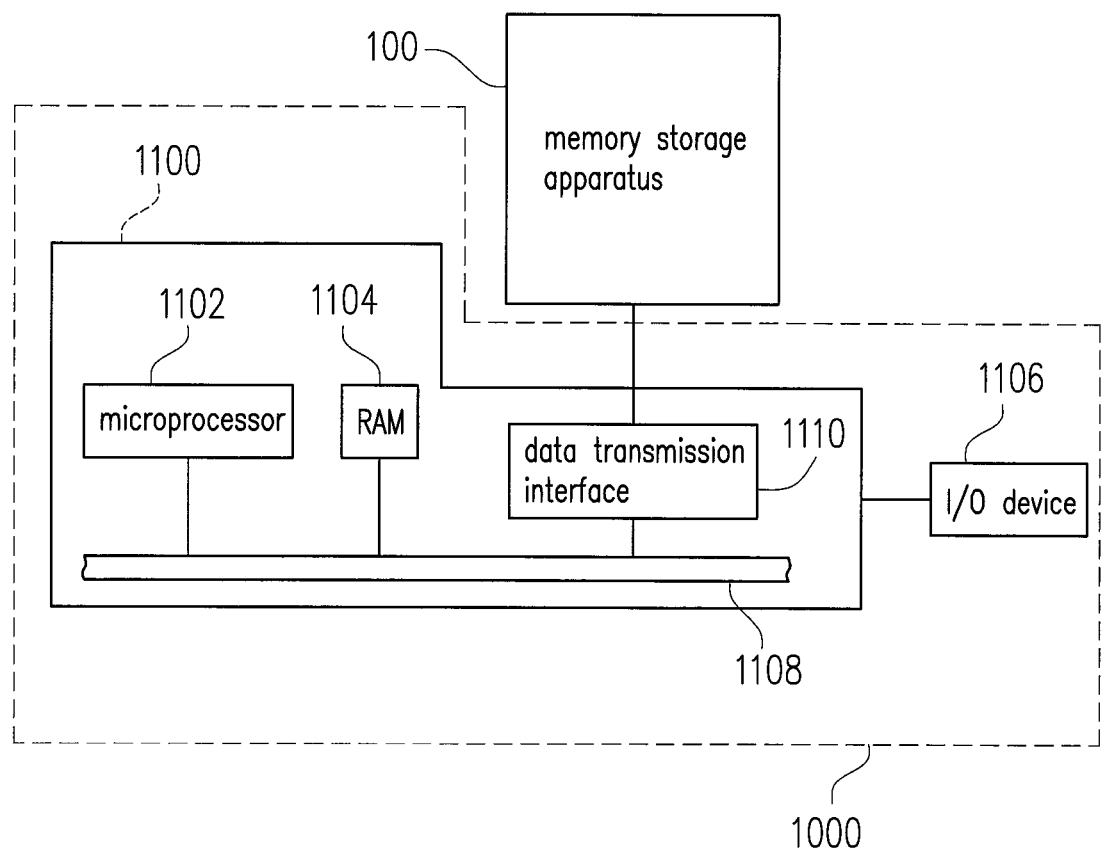
FIG. 1 illustrates a host system and a memory storage apparatus according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage apparatus (aka memory storage system) includes a rewritable non-volatile memory module and a controller (aka control circuit). The memory storage apparatus is usually used together with a host system, so that the host system writes data into or reads data from the memory storage apparatus.

FIG. 1 illustrates a host system and a memory storage apparatus according to an exemplary embodiment.

Figure 2:
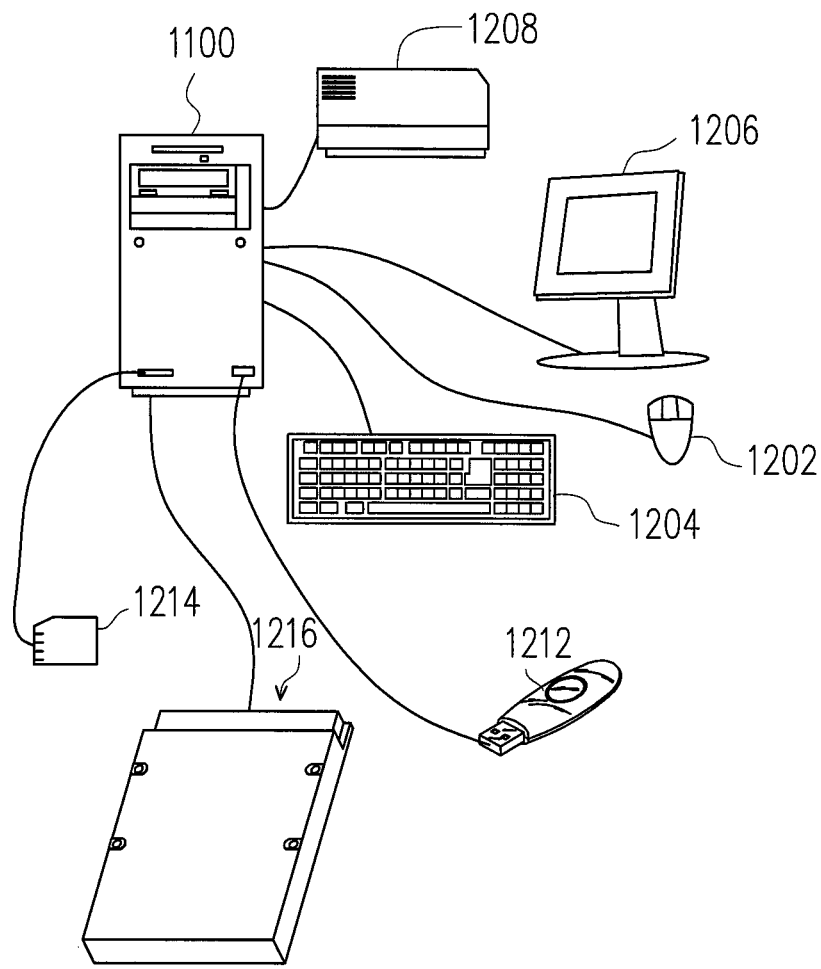
FIG. 2 is a schematic diagram illustrating a computer, an input/output device and a memory storage apparatus according to exemplary embodiments of the invention.

Referring to FIG. 1, a host system 1000 generally includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206 and a printer 1208 as shown in FIG. 2. It should be understood that the devices shown in FIG. 2 are not intended to limit the I/O device 1106, and the I/O device 1106 may further include other devices.

In exemplary embodiments of the present invention, a memory storage apparatus 100 is coupled to other elements of the host system 1000 through the data transmission interface 1110. Through operation of the microprocessor 1102, the RAM 1104 and the I/O device 1106, data is written in or read from the memory storage apparatus 100. For instance, the memory storage apparatus 100 may be a rewritable non-volatile memory storage apparatus, such as a flash drive 1212, a memory card 1214, or a solid state drive (SSD) 1216, as shown in FIG. 2.

Figure 3:
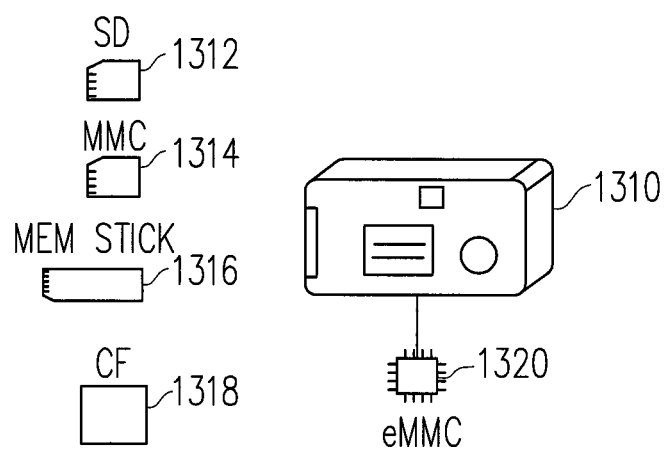
FIG. 3 is a schematic diagram illustrating a host system and a memory storage apparatus according to exemplary embodiments of the invention.

Generally speaking, the host system 1000 is any system substantially operated in combination with the memory storage apparatus 100 for storing data. Even though the host system 1000 is described as a computer system in the present exemplary embodiment, in another exemplary embodiment of the invention, the host system 1000 may be a digital camera, a video camera, a telecommunication device, an audio player, or a video player. For instance, when the host system is a digital camera (video camera) 1310, the rewritable non-volatile memory storage apparatus is then a Secure Digital (SD) card 1312, a MultiMediaCard (MMC) 1314, a memory stick 1316, a CompactFlash (CF) card 1318 or an embedded storage apparatus 1320 (as shown in FIG. 3) that is employed by the digital camera (video camera) 1310. The embedded storage apparatus 1320 includes an embedded MMC (eMMC). It is worth mentioning that the eMMC is directly coupled to a substrate of the host system.

Figure 4:
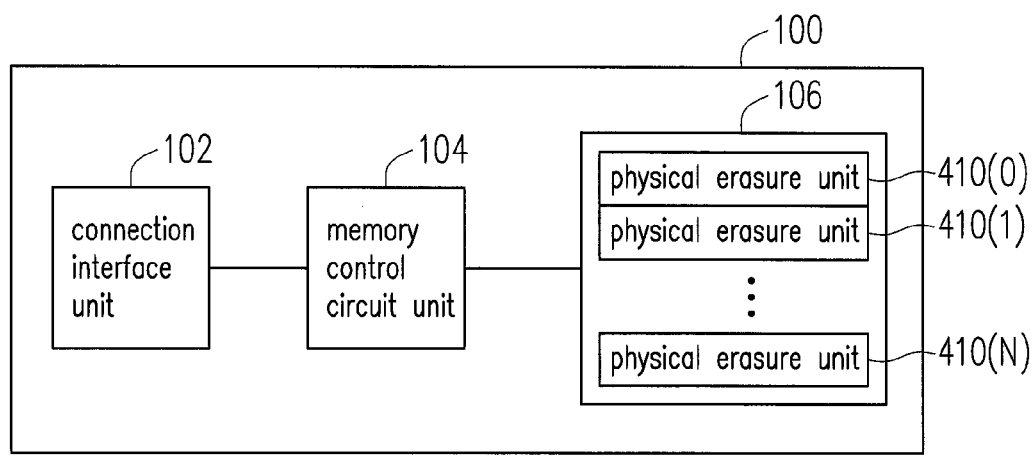
FIG. 4 is a schematic block diagram illustrating the memory storage apparatus shown in FIG. 1.

FIG. 4 is a schematic block diagram illustrating the memory storage apparatus shown in FIG. 1.

Referring to FIG. 4, the memory storage apparatus 100 includes a connection interface unit 102, a memory control circuit unit 104, and a rewritable non-volatile memory module 106.

In the present exemplary embodiment, the connection interface unit 102 complies with a Serial Advanced Technology Attachment (SATA) standard. However, it should be understood that the invention is not limited thereto. The connection interface unit 102 may also comply with a Parallel Advanced Technology Attachment (PATA) standard, an Institute of Electrical and Electronic Engineers (IEEE) 1394 standard, a Peripheral Component Interconnect Express (PCI Express) standard, a Universal Serial Bus (USB) standard, an Ultra-High Speed-I (UHS-I) interface standard, an Ultra-High Speed-II (UHS-II) interface standard, a Secure Digital (SD) interface standard, a Memory Stick (MS) interface standard, a MultiMediaCard (MMC) interface standard, a CompactFlash (CF) interface standard, an Integrated Device Electronics (IDE) standard, or other suitable standards. In the present exemplary embodiment, the connection interface unit 102 is packaged with the memory control circuit unit 104 in a chip, or is disposed outside a chip containing the memory control circuit unit 104.

The memory control circuit unit 104 is configured to execute a plurality of logic gates or control instructions implemented in a hardware form or in a firmware form, and to perform operations such as data writing, data reading and data erasing in the rewritable non-volatile memory module 106 according to commands of the host system 1000.

The rewritable non-volatile memory module 106 is coupled to the memory control circuit unit 104 and is configured to store the data written by the host system 1000. The rewritable non-volatile memory module 106 includes physical erasing units 410(0)-410(N). For instance, the physical erasing units 410(0)-410(N) may belong to the same memory die or different memory dies. Each physical erasing unit has a plurality of physical programming units, wherein the physical programming units that belong to the same physical erasing unit may be written independently and be erased simultaneously. However, it should be understood that the invention is not limited thereto. Each physical erasing unit may consist of 64, 256, or any other number of physical programming units.

To be more specific, physical erasing unit is the smallest unit for data erasing. That is to say, each physical erasing unit has a minimum number of memory cells to be erased together. Physical programming unit is the smallest unit for programming. That is to say, physical programming unit is the smallest unit for data writing. Each physical programming unit usually includes a data bit area and a redundant bit area. The data bit area includes a plurality of physical access addresses and is configured to store user data, while the redundant bit area is configured to store system data (e.g. control information and error-correcting codes). In the present exemplary embodiment, the data bit area of each physical programming unit includes 4 physical access addresses with each physical access address having a size of 512 bytes. However, in other exemplary embodiments, one data bit area may include 8, 16, or more or fewer physical access addresses. The present invention does not limit the size or number of the physical access addresses. For instance, in an exemplary embodiment, a physical erasing unit is a physical block, and a physical programming unit is a physical page or physical sector. However, the invention is not limited thereto.

In the present exemplary embodiment, the rewritable non-volatile memory module 106 is a multi-level cell (MLC) NAND flash memory module (i.e. a flash memory module in which one memory cell stores two bits of data). However, the present invention is not limited thereto. The rewritable non-volatile memory module 106 may also be a single-level cell (SLC) NAND flash memory module (i.e. a flash memory module in which one memory cell stores one bit of data), a trinary-level cell (TLC) NAND flash memory module (i.e. a flash memory module in which one memory cell stores three bits of data), any other type of flash memory module, or any other memory module having the same characteristics.

Figure 5:
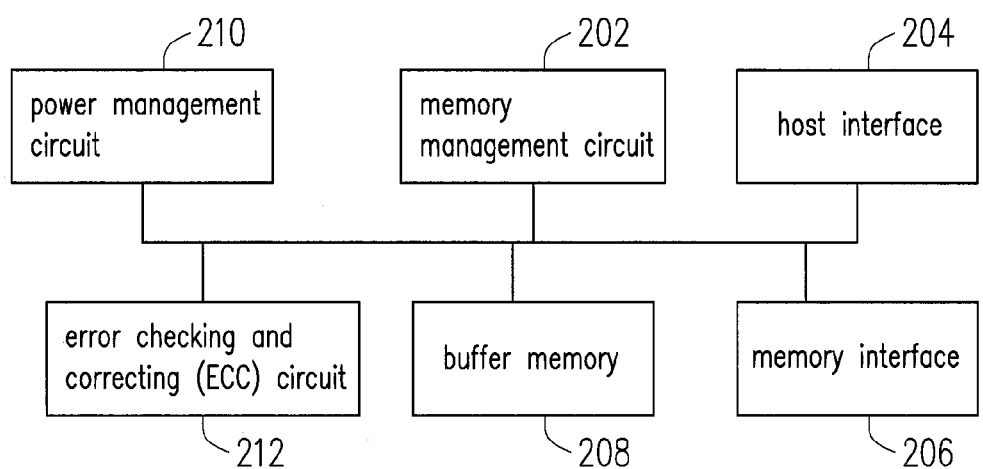
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 104 includes a memory management circuit 202, a host interface 204 and a memory interface 206.

The memory management circuit 202 is configured to control an overall operation of the memory control circuit unit 104. Specifically, the memory management circuit 202 has a plurality of control instructions. When the memory storage apparatus 100 is operated, the control instructions are executed to perform operations such as data writing, data reading and data erasing.

In the present exemplary embodiment, the control instructions of the memory management circuit 202 are implemented in a firmware form. For instance, the memory management circuit 202 has a microprocessor unit (not shown) and a read-only memory (not shown), and the control instructions are burnt into the read-only memory. When the memory storage apparatus 100 is operated, the control instructions are executed by the microprocessor unit to perform the operations such as data writing, data reading or data erasing.

In another exemplary embodiment of the present invention, the control instructions of the memory management circuit 202 may also be stored in a specific area (for instance, a system area in the memory module exclusively used for storing system data) of the rewritable non-volatile memory module 106 as program codes. In addition, the memory management circuit 202 has a microprocessor unit (not shown), a read-only memory (not shown), and a random access memory (not shown). Particularly, the read-only memory has a boot code. When the memory control circuit unit 104 is enabled, the boot code is first executed by the microprocessor unit for loading the control instructions stored in the rewritable non-volatile memory module 106 into the random access memory of the memory management circuit 202. Afterwards, the microprocessor unit executes the control instructions to perform the operations such as data writing, data reading and data erasing.

In addition, in another exemplary embodiment of the invention, the control instructions of the memory management circuit 202 may be implemented in a hardware form. For instance, the memory management circuit 202 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage physical erasing units of the rewritable non-volatile memory module 106; the memory writing circuit is configured to give a write command to the rewritable non-volatile memory module 106 in order to write data into the rewritable non-volatile memory module 106; the memory reading circuit is configured to give a read command to the rewritable non-volatile memory module 106 in order to read data from the rewritable non-volatile memory module 106; the memory erasing circuit is configured to give an erase command to the rewritable non-volatile memory module 106 in order to erase data from the rewritable non-volatile memory module 106; and the data processing circuit is configured to process both the data to be written into the rewritable non-volatile memory module 106 and the data to be read from the rewritable non-volatile memory module 106.

The host interface 204 is coupled to the memory management circuit 202 and is configured to receive and identify commands and data transmitted by the host system 1000. Namely, the commands and data transmitted by the host system 1000 are passed to the memory management circuit 202 through the host interface 204. In the present exemplary embodiment, the host interface 204 complies with the SATA standard. However, it should be understood that the invention is not limited thereto. The host interface 204 may also comply with the PATA standard, the IEEE 1394 standard, the PCI Express standard, the USB standard, the UHS-I interface standard, the UHS-II interface standard, the SD standard, the MS standard, the MMC standard, the CF standard, the IDE standard, or other suitable standards for data transmission.

The memory interface 206 is coupled to the memory management circuit 202 and is configured to access the rewritable non-volatile memory module 106. That is to say, the data to be written into the rewritable non-volatile memory module 106 is converted to an acceptable format to the rewritable non-volatile memory module 106 by the memory interface 206.

In an exemplary embodiment of the invention, the memory control circuit unit 104 also includes a buffer memory 208, a power management circuit 210 and an error checking and correcting (ECC) circuit 212.

The buffer memory 208 is coupled to the memory management circuit 202 and is configured to temporarily store the data and commands from the host system 1000 or the data from the rewritable non-volatile memory module 106.

The power management circuit 210 is coupled to the memory management circuit 202 and is configured to control a power of the memory storage apparatus 100.

The ECC circuit 212 is coupled to the memory management circuit 202 and is configured to execute an error checking and correcting (ECC) procedure to ensure accuracy of data. Specifically, when the memory management circuit 202 receives a write command from the host system 1000, the ECC circuit 212 generates a corresponding ECC code for the data corresponding to the write command, and the memory management circuit 202 writes the data corresponding to the write command and the corresponding ECC code into the rewritable non-volatile memory module 106. After that, when the memory management circuit 202 reads the data from the rewritable non-volatile memory module 106, the ECC code corresponding to the data is also read by the rewritable non-volatile memory module 106 at the same time, and the ECC circuit 212 executes the ECC procedure for the read data based on the ECC code.

Figure 6:
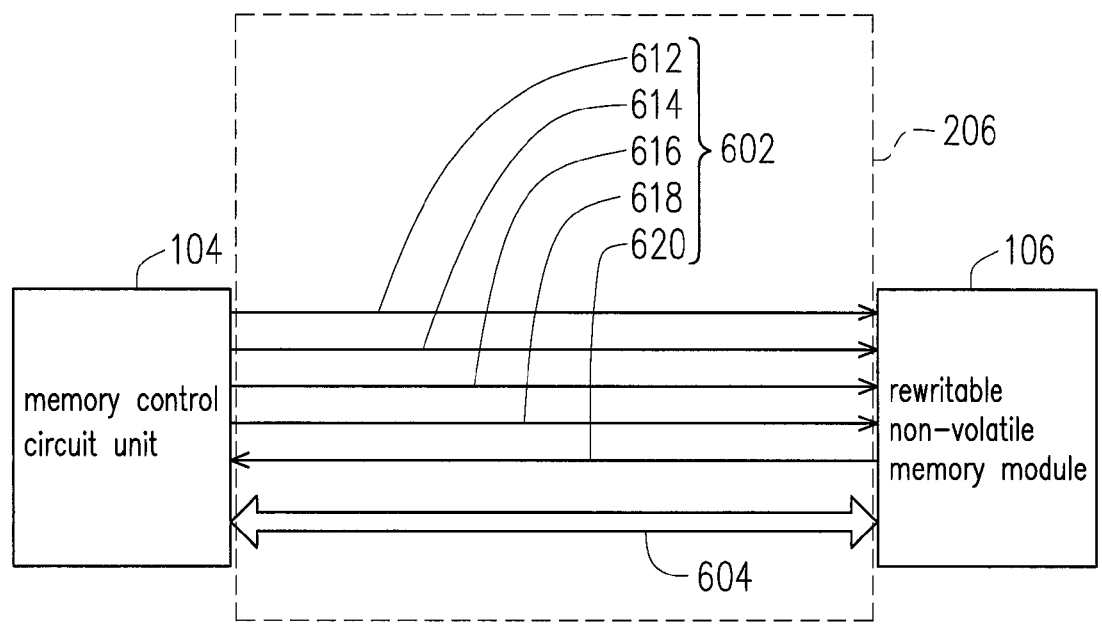
FIG. 6 is a detailed block diagram illustrating a memory interface for connecting a memory control circuit unit with a rewritable non-volatile memory module according to an exemplary embodiment of the invention.

FIG. 6 is a detailed block diagram illustrating a memory interface for connecting a memory control circuit unit with a rewritable non-volatile memory module according to an exemplary embodiment of the invention.

Referring to FIG. 6, the memory interface 206 includes a control bus 602 and a data bus 604. Moreover, the control bus 602 includes a chip enable (CE) pin 612, a command latch enable (CLE) pin 614, an address latch enable (ALE) pin 616, a write protect (WP) pin 618 and a ready/busy pin 620.

The memory control circuit unit 104 (or the memory management circuit 202) gives a control command to the rewritable non-volatile memory module 106 through the control bus 602, and obtains a status of the rewritable non-volatile memory module 106 through the control bus 602. In addition, the memory control circuit unit 104 (or the memory management circuit 202) transmits data to or receives data from the rewritable non-volatile memory module 106 through the data bus 604. Based on the above, through the control bus 602 and the data bus 604, the memory control circuit unit 104 (or the memory management circuit 202) is capable of performing operations such as reset, write, read, and erase on the rewritable non-volatile memory module 106.

In the present exemplary embodiment, when the memory storage apparatus 100 is powered on, the memory control circuit unit 104 (or the memory management circuit 202) transmits a chip enable (CE) signal to the rewritable non-volatile memory module 106 through the CE pin 612, and transmits a reset command to the rewritable non-volatile memory module 106 through the CLE pin 614. Particularly, after the rewritable non-volatile memory module 106 is reset, the memory control circuit unit 104 (or the memory management circuit 202) sets an output voltage of the WP pin 618 as a first logic level. For instance, in the present exemplary embodiment, the first logic level is a logic high level.

Then, the memory control circuit unit 104 (or the memory management circuit 202) transmits a read status command through the CLE pin 614, and receives a first status message in response to the read status command through the data bus 604. Moreover, the memory control circuit unit 104 (or the memory management circuit 202) determines whether a bit data in the first status message (e.g. the eighth bit data, i.e. 'bit 7', in the first status message) that corresponds to the WP pin 618 is in a status corresponding to that where the output voltage of the WP pin 618 is set as the first logic level. For instance, in a case where the first logic level is a logic high level, the status corresponding to that where the output voltage of the WP pin 618 is set as the first logic level is '0.' If the bit data in the first status message that corresponds to the WP pin 618 is not in the status corresponding to that where the output voltage of the WP pin 618 is set as the first logic level, the memory control circuit unit 104 (or the memory management circuit 202) determines that the rewritable non-volatile memory module 106 does not connect to the memory interface 206.

If the bit data in the first status message that corresponds to the WP pin 618 is in the status corresponding to that where the output voltage of the WP pin 618 is set as the first logic level, the memory control circuit unit 104 (or the memory management circuit 202) further sets the output voltage of the WP pin 618 as a second logic level. For instance, in the present exemplary embodiment, the second logic level is a logic low level.

Then, the memory control circuit unit 104 (or the memory management circuit 202) transmits the read status command through the CLE pin 614, and receives a second status message in response to the read status command through the data bus 604. Moreover, the memory control circuit unit 104 (or the memory management circuit 202) determines whether a bit data in the second status message (e.g. the eighth bit data, i.e. 'bit 7', in the second status message) that corresponds to the WP pin 618 is in a status corresponding to that where the output voltage of the WP pin 618 is set as the second logic level. For instance, in a case where the second logic level is a logic low level, the status corresponding to that where the output voltage of the WP pin 618 is set as the second logic level is '1.' If the bit data in the second status message that corresponds to the WP pin 618 is not in the status corresponding to that where the output voltage of the WP pin 618 is set as the second logic level, the memory control circuit unit 104 (or the memory management circuit 202) determines that the rewritable non-volatile memory module 106 does not connect to the memory interface 206.

If the bit data in the first status message that corresponds to the WP pin 618 is in the status corresponding to that where the output voltage of the WP pin 618 is set as the first logic level, and the bit data in the second status message that corresponds to the WP pin 618 is in the status corresponding to that where the output voltage of the WP pin 618 is set as the second logic level, the memory control circuit unit 104 (or the memory management circuit 202) determines that the rewritable non-volatile memory module 106 has connected to the memory interface 206.

In the present exemplary embodiment, after determining that the rewritable non-volatile memory module 106 does not connect to the memory interface 206 by responding to the status of the logic level of the WP pin 618, the memory control circuit unit 104 (or the memory management circuit 202) transmits an error message to the host system 1000, rather than having to wait for a signal from the ready/busy pin 620.

It should be understood that although the present exemplary embodiment illustrates one rewritable non-volatile memory module 106, the present invention is not limited thereto. For instance, in a memory storage apparatus having a plurality of rewritable non-volatile memory modules, memory control circuit units (or memory management circuits) thereof may synchronously perform the aforementioned detection and determination operations on a plurality of control buses and data buses connected to the rewritable non-volatile memory modules. Particularly, in such a case of the memory storage apparatus having a plurality of rewritable non-volatile memory modules, through the write protect pin of each control bus, it is more promptly determined whether each rewritable non-volatile memory module has successfully connected to the memory control circuit unit.

In addition, it is worth mentioning that in the present exemplary embodiment, the ready/busy pin 620 is still operated normally, and the memory control circuit unit 104 (or the memory management circuit 202) obtains whether the rewritable non-volatile memory module 106 is in an idle or a busy condition through a signal in the ready/busy pin 620. Nonetheless, in another exemplary embodiment of the invention, the control bus 602 is not provided with the ready/busy pin 620. Specifically, when the memory storage apparatus 100 is powered on, the memory control circuit unit 104 (or the memory management circuit 202) determines whether the rewritable non-volatile memory module 106 has connected to the memory interface 206 by responding to the status of the logic level of the WP pin 618. Then, during operation of the rewritable non-volatile memory module 106, the memory control circuit unit 104 (or the memory management circuit 202) transmits the read status command through the CLE pin 614, receives a status message in response to the read status command through the data bus 604, and determines whether the rewritable non-volatile memory module 106 is in the idle or the busy condition according to the bit data in the status message. Therefore, it is also possible that no ready/busy pin 620 is provided and connected between the memory control circuit unit 104 and the rewritable non-volatile memory module 106.

Figure 7:
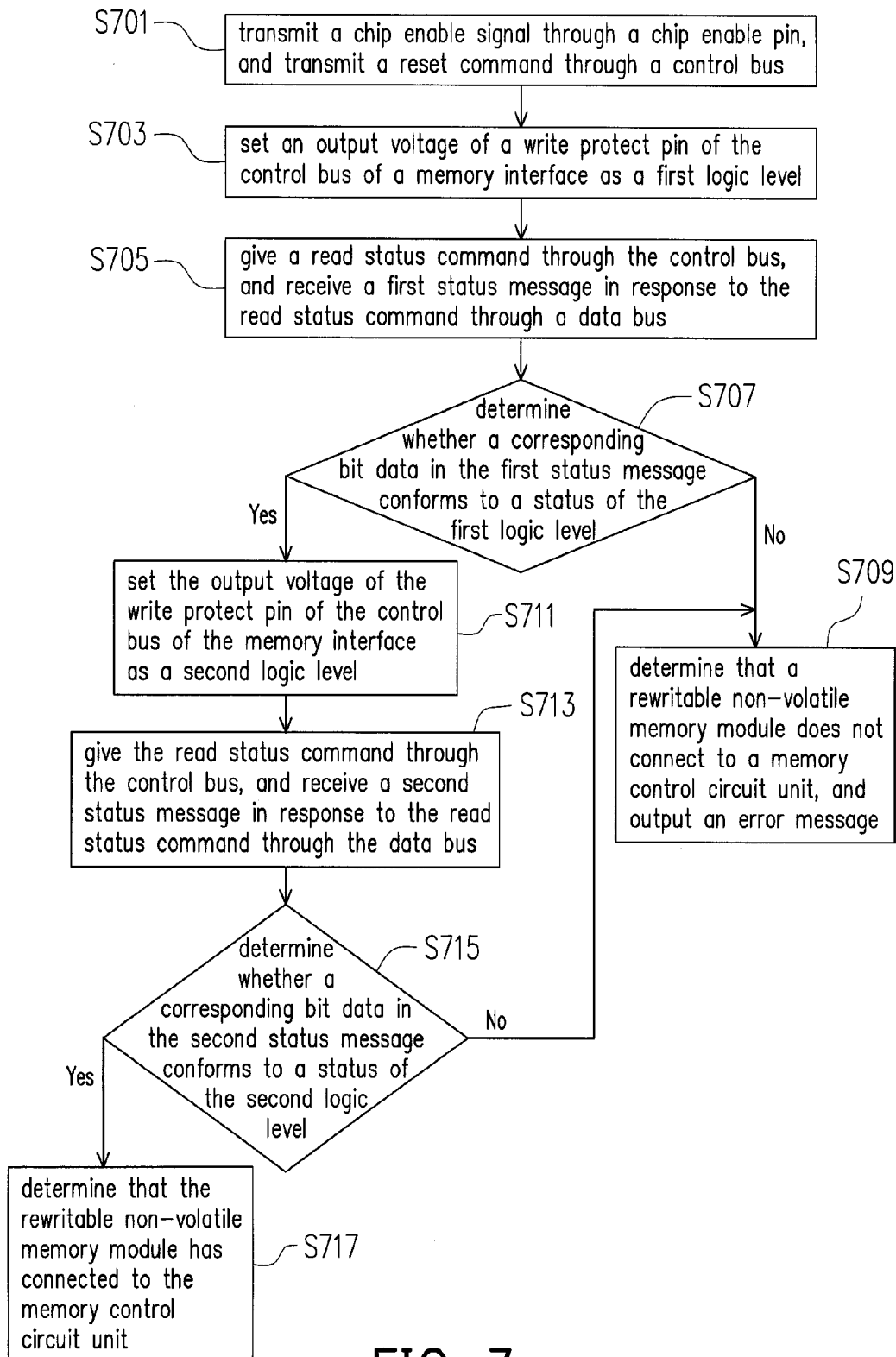
FIG. 7 is a flowchart illustrating a method of detecting a rewritable non-volatile memory module according to an exemplary embodiment.

FIG. 7 is a flowchart illustrating a method of detecting a rewritable non-volatile memory module according to an exemplary embodiment.

Referring to FIG. 7, when the memory storage apparatus 100 is powered on, in step S701, the memory control circuit unit 104 (or the memory management circuit 202) transmits the CE signal through the CE pin 612, and transmits the reset command through the control bus 602 (e.g. the CLE pin 614).

After that, in step S703, the memory control circuit unit 104 (or the memory management circuit 202) sets the output voltage of the WP pin 618 of the control bus 602 of the memory interface 206 as the first logic level.

Then, in step S705, the memory control circuit unit 104 (or the memory management circuit 202) gives the read status command through the control bus 602, and receives the first status message in response to the read status command through the data bus 604. Moreover, in step S707, the memory control circuit unit 104 (or the memory management circuit 202) determines whether a corresponding bit data in the first status message conforms to a status of the first logic level. Specifically, as mentioned above, the eighth bit data (i.e. bit 7) in the status message in response to the read status command corresponds to a status of the WP pin 618, and the memory control circuit unit 104 (or the memory management circuit 202) determines whether a value of the bit data conforms to the status of the first logic level of the WP pin 618.

If the corresponding bit data in the first status message does not conform to the status of the first logic level, in step S709, the memory control circuit unit 104 (or the memory management circuit 202) determines that the rewritable non-volatile memory module 106 does not connect to the memory control circuit unit 104, and outputs an error message.

If the corresponding bit data in the first status message conforms to the status of the first logic level, in step S711, the memory control circuit unit 104 (or the memory management circuit 202) sets the output voltage of the WP pin 618 of the control bus 602 of the memory interface 206 as the second logic level.

Then, in step S713, the memory control circuit unit 104 (or the memory management circuit 202) gives the read status command through the control bus 602, and receives the second status message in response to the read status command through the data bus 604. Moreover, in step S715, the memory control circuit unit 104 (or the memory management circuit 202) determines whether a corresponding bit data in the second status message conforms to a status of the second logic level.

If the corresponding bit data in the second status message does not conform to the status of the second logic level, step S709 is then executed. If the contrary is the case, in step S717, the memory control circuit unit 104 (or the memory management circuit 202) determines that the rewritable non-volatile memory module 106 has connected to the memory control circuit unit 104. For instance, after step S717, the memory control circuit unit 104 (or the memory management circuit 202) executes an initialization operation according to the status of the rewritable non-volatile memory module 106.

It should be understood that in the present exemplary embodiment, only when determining that the corresponding bit data in the first status message conforms to the status of the first logic level and the corresponding bit data in the second status message conforms to the status of the second logic level at the same time, the memory control circuit unit 104 (or the memory management circuit 202) identifies that the rewritable non-volatile memory module 106 has connected to the memory control circuit unit 104. However, the present invention is not limited thereto. In another exemplary embodiment of the present invention, the memory control circuit unit 104 (or the memory management circuit 202) also determines that the rewritable non-volatile memory module 106 has connected to the memory control circuit unit 104 simply when the corresponding bit data in the first status message conforms to the status of the first logic level. That is to say, steps S713 and S715 may be omitted.

In summary, according to the method of detecting a rewritable non-volatile memory module, the memory control circuit unit and the memory storage apparatus in the exemplary embodiments of the invention, by setting the output voltage of the write protect pin and determining whether the rewritable non-volatile memory module is normally connected according to the read status, the time required for detecting the rewritable non-volatile memory module is reduced. The previously described exemplary embodiments of the present invention have the advantages aforementioned, wherein the advantages aforementioned not required in all versions of the invention.

What is claimed is:

1. A method of detecting a rewritable non-volatile memory module by a memory control circuit unit through a memory interface, the method comprising:
   (a) by the memory control circuit unit, setting an output voltage of a write protect pin of a control bus of the memory interface as a first logic level for the rewritable non-volatile memory module, giving a read status command through the control bus to the rewritable non-volatile memory module, and receiving a first status message through a data bus of the memory interface from the rewritable non-volatile memory module in response to the read status command, wherein the control bus and the data bus are buses independent from each other;
   (b) by the memory control circuit unit, determining whether a bit data representing a logic status of the write protect pin in the first status message conforms to a status corresponding to the first logic level;
   (c) by the memory control circuit unit, setting an output voltage of the write protect pin of the control bus as a second logic level, giving the read status command through the control bus, and receiving a second status message through the data bus;
   (d) by the memory control circuit unit, determining whether the bit data representing the logic status of the write protect pin in the second status message conforms to a status corresponding to the second logic level; and
   (e) if the bit data representing the logic status of the write protect pin in the first status message conforms to the status corresponding to the first logic level and the bit data representing the logic status of the write protect pin in the second status message conforms to the status corresponding to the second logic level, identifying that the rewritable non-volatile memory module has physically connected to the memory interface by the memory control circuit unit.

2. The method as claimed in claim 1, further comprising:
   before performing the step (a), by the memory control circuit unit, giving a reset command through the control bus.

3. The method as claimed in claim 2, further comprising:
   before giving the reset command through the control bus, by the memory control circuit unit, transmitting a chip enable signal through a chip enable pin of the control bus.

4. The method as claimed in claim 1, wherein the step (a), the step (b) and the step (e) are performed in response to powering on of the memory control circuit unit.

5. The method as claimed in claim 1, wherein the control bus of the memory interface is provided with no ready/busy pin.

6. A memory control circuit unit, comprising:
   a memory interface comprising a control bus and a data bus, wherein the control bus comprises a write protect pin, and the control bus and the data bus are buses independent from each other; and
   a memory management circuit coupled to the memory interface, and configured to set an output voltage of the write protect pin as a first logic level for the rewritable non-volatile memory module, give a read status command through the control bus to the rewritable non-volatile memory module, and receive a first status message through the data bus from the rewritable non-volatile memory module in response to the read status command,
   wherein the memory management circuit is further configured to determine whether a bit data representing a logic status of the write protect pin in the first status message conforms to a status corresponding to the first logic level,
   wherein the memory management circuit is further configured to set an output voltage of the write protect pin of the control bus as a second logic level, give the read status command through the control bus, and receive a second status message through the data bus,
   wherein the memory management circuit is further configured to determine whether the bit data representing the logic status of the write protect pin in the second status message conforms to a status corresponding to the second logic level,
   wherein if the bit data representing the logic status of the write protect pin in the first status message conforms to the status corresponding to the first logic level and the bit data representing the logic status of the write protect pin in the second status message conforms to the status corresponding to the second logic level, the memory management circuit identifies that a rewritable non-volatile memory module has physically connected to the memory interface.

7. The memory control circuit unit as claimed in claim 6, wherein the memory management circuit is further configured to give a reset command through the control bus.

8. The memory control circuit unit as claimed in claim 7, wherein the memory management circuit is further configured to transmit a chip enable signal through a chip enable pin of the control bus before giving the reset command through the control bus.

9. The memory control circuit unit as claimed in claim 6, wherein the control bus of the memory interface further comprises a command latch enable pin, an address latch enable pin and a chip enable pin.

10. The memory control circuit unit as claimed in claim 9, wherein the control bus of the memory interface is provided with no ready/busy pin.

11. A memory storage apparatus, comprising:
    a connection interface unit configured to be coupled to a host system;
    a rewritable non-volatile memory module comprising a plurality of physical erasing units; and
    a memory control circuit unit coupled to the connection interface unit and the rewritable non-volatile memory module, and comprising a memory interface,
    wherein the memory control circuit unit is configured to set an output voltage of a write protect pin of a control bus of the memory interface as a first logic level for the rewritable non-volatile memory module, give a read status command through the control bus to the rewritable non-volatile memory module, and receive a first status message through a data bus of the memory interface from the rewritable non-volatile memory module in response to the read status command, wherein the control bus and the data bus are buses independent from each other, wherein the memory control circuit unit is further configured to determine whether a bit data representing a logic status of the write protect pin in the first status message conforms to a status corresponding to the first logic level, wherein the memory control circuit unit is further configured to set an output voltage of the write protect pin of the control bus as a second logic level, give the read status command through the control bus, and receive a second status message through the data bus, wherein the memory control circuit unit is further configured to determine whether the bit data representing the logic status of the write protect pin in the second status message conforms to a status corresponding to the second logic level, wherein if the bit data representing the logic status of the write protect pin in the first status message conforms to the status corresponding to the first logic level and the bit data representing the logic status of the write protect pin in the second status message conforms to the status corresponding to the second logic level, the memory control circuit unit identifies that the rewritable non-volatile memory module has physically connected to the memory interface.

12. The memory storage apparatus as claimed in claim 11, wherein the memory control circuit unit is further configured to give a reset command through the control bus.

13. The memory storage apparatus as claimed in claim 12, wherein the memory control circuit unit is further configured to transmit a chip enable signal through a chip enable pin of the control bus before giving the reset command through the control bus.

14. The memory storage apparatus as claimed in claim 11, wherein the control bus of the memory interface further comprises a command latch enable pin, an address latch enable pin and a chip enable pin.

15. The memory storage apparatus as claimed in claim 14, wherein the control bus of the memory interface is provided with no ready/busy pin.

* * * * *